United States Patent [19]

Harrison

[11] Patent Number: 4,769,166
[45] Date of Patent: Sep. 6, 1988

[54] EXPANDABLE MAGNETIC SEALANT
[75] Inventor: Bruce Harrison, St. Louis, Mo.
[73] Assignee: United Technologies Automotive, Inc., Dearborn, Mich.
[21] Appl. No.: 56,163
[22] Filed: Jun. 1, 1987
[51] Int. Cl.[4] .................................. H01F 1/04
[52] U.S. Cl. ....................... 252/62.54; 277/80
[58] Field of Search ................ 252/62.54; 277/80

[56] References Cited

U.S. PATENT DOCUMENTS

| | | | |
|---|---|---|---|
| 2,959,832 | 11/1960 | Baermann | 24/303 |
| 3,132,386 | 5/1964 | Swaneck, Jr. | 49/402 |
| 3,147,176 | 9/1964 | Haslam | 428/55 |
| 3,472,546 | 10/1969 | Samuels | 293/1 |
| 3,668,176 | 6/1972 | Childress | 252/62.54 |
| 4,032,682 | 6/1977 | Masson | 428/309 |
| 4,405,674 | 9/1983 | Kyle | 428/96 |
| 4,427,481 | 1/1984 | Smith et al. | 156/306.6 |
| 4,447,475 | 5/1984 | Lubbock et al. | 427/213.31 |
| 4,546,035 | 10/1985 | Ko et al. | 428/315.9 |
| 4,567,096 | 1/1986 | Piltingsrud et al. | 428/315.5 |

FOREIGN PATENT DOCUMENTS

| | | | |
|---|---|---|---|
| 0152444 | 11/1981 | German Democratic Rep. | 252/62.54 |
| 58-125727 | 7/1983 | Japan | 252/62.54 |
| 59-196340 | 11/1984 | Japan | 252/62.54 |

Primary Examiner—Steven Capella

[57] ABSTRACT

Disclosed is a novel, magnetic sealant comprising a styrene blocked copolymer, a solubilizing agent, magnetic particles and a blowing agent which will, upon exposure to temperature, will cause the sealant to melt and be drawn toward the magnetically attractive substrate and will also foam, thereby increasing in dimension to fill irregular gap.

6 Claims, 1 Drawing Sheet

EXPANDABLE MAGNETIC SEALANT

TECHNICAL FIELD

The present invention relates to the field of art which pertains to sealants and adhesives, in particular those sealants and adhesives which possess magnetic properties.

BACKGROUND ART

Magnetic sealants of the prior art are typically mixtures of synthetic polymers, resins, plasticizers and magnetically chargeable particles. Typically, these sealants are prepared in tape form, through an extrusion process and used to seal seams in sheet metal structures. The magnetic tape is placed over the seam and remains in position during processing through the magnetic attraction between the sealant and the substrate until the structure is passed through a heating process which causes the tape to melt and flow into the seam sealing any gaps or openings that may have existed.

However, these materials are not useful in situations where a sizable gap exists, for example, due to the overlapping of two surfaces, especially where the gap is irregular in that the opening varies in dimension.

Therefore, what is needed in this art is a magnetic sealant or adhesive which will remain in place during processing but when exposed to heat will be capable of expanding and filling such gaps more completely.

DISCLOSURE OF INVENTION

The present invention is for a synthetic magnetic sealant comprising one or more styrene elastomeric block copolymers, a solubilizing agent and a blowing agent as well as magnetically chargeable particles in which the resulting sealant, when exposed to its melt temperature will melt and flow and additionally will foam to increase in thickness and thereby fill the gaps to be sealed.

Also disclosed is a method of filling gaps between two interfacing materials by applying and activating the foamable magnetic sealant of the present invention.

Other features and advantages will be apparent from the specification and claims and from the accompanying drawings which illustrate an embodiment of the invention.

BEST MODE FOR CARRYING OUT THE INVENTION

Figure 1:
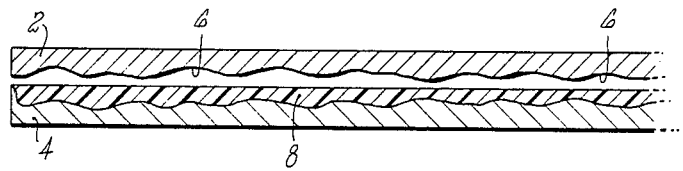
FIG. 1 is a cross-sectional view of two mating surfaces in the present sealant prior to expansion.

The sealant base material for this invention is any of the conventional styrene block elastomeric copolymers. These elastomeric block portions can be either saturated or unsaturated, aliphatic, aromatic or cyclic and may be comprised of a single copolymer or a mixture of them. The preferred materials are listed below:
Styrene Butadiene Styrene
Styrene Polyethylene Butadiene Styrene
Styrene Isoprene Styrene
Styrene Butadiene Rubber
with the most preferred being styrene polyethylene butadiene styrene which is available as Krayton ® G 1600 series from Shell Chemical Corporation. These materials are triblock copolymers with an elastomeric block in the center and a thermoplastic block on each end of the molecule. The elastomeric midblock may be saturated or unsaturated depending on the properties desired in the final product. Saturated elastomeric members will have better ozone, oxygen and ultraviolet light resistance than the unsaturated members. The choice of which copolymer to use will be made based on the desired melt temperature of the final sealant and the amount of dimensional increase associated with the foaming. It may be possible to formulate a tape having a mixture of two or more of these block copolymers and should not be limited to a single elastomer-styrene copolymer.

These particular compounds are uniquely suited for the adhesive as they have what may be described as reversible cross-linking. The styrene constituent at the end of the molecule forms a discrete phase separate from the rubber component yet chemically connected to it, while the polystyrene ends are united together forming a physical cross-linking network which is thermally reversible. Thereby supplying significant structural integrity to the tape as applied and handled at room temperature yet can be melted and caused to flow at elevated temperatures. The preferred block copolymer components should have tensile strengths of about 2,000 pounds per square inch (psi) to about 5,000 psi (as determined by the American Society of Testing and Materials Method D412 at 75° F.). Such parameters will allow the product to foam adequately during expansion but yet will be capable of containing the blow thereby producing an expanded sealant.

Since the styrene block copolymers as described above do not possess adequate film forming characteristics and are difficult to extrude in an uncompounded form, a second component is added which improves this film forming characteristics such that the stryene copolymer will catch the blow as the blowing agents are activated. In addition, the second component lowers the melt temperature of the block stryene copolymer, improves its compatibility with the other constituents which are to be added such as the blowing agents, oils, etc. and allows the material to be processes or extruded more easily. Therefore, a second component is mixed into the copolymer to lower its melt temperature to be compatible with the blowing agent and allow the material to be extruded or processed more easily. For purposes of this invention, such components shall be termed solubilizing agents and may be any compatible low viscous resin. Many of these are commonly known as tackifiers. A listing of some of the more common agents is set forth below.
Escorez ® 2520—Exxon Corporation
Wingtac ® 10—Goodyear Tire & Rubber
Wingtac ® 95—Goodyear Tire & Rubber
Furac ® 10—Hercules Inc.

Such solubilizing agents are typically polyterpenes, hydrogenated hydrocarbons or polymerized mixed olefins. Some of the more preferred materials in the polyterpene grouping may be Piccofyn A-100 available from Shell Chemical Company, while in the hydrogenated hydrocarbon they may be selected from the Escorez ® 5000 series made by Exxon Corporation and the polymerized mixed olefins may be selected from the Wingtac ® series manufactured by the Goodyear Tire and Rubber Company.

Not all of the agents will work well with ever copolymer, however, one skilled in the art can easily determine which ones are most compatible with which copolymer. The most preferred combination are the phenolic resins such as Bakelite CK2103, Super Beckacite 2000, available from Reichhold Chemical Company, and Super Beckacite 2100 for use with the stryrene polyethylene butadyne styrene copolymer (Kraton ® G). Typically, these solubilizing agents will be present from about 20 percent by weight to about 50 percent by weight of the copolymer with about 50 percent being preferred. It should be pointed out that these solubilizing agents do not react with the copolymers but merely act as plasticizing agents or processing agents.

In addition to these two agents, a blowing agent is added to the mixture. These blowing agents are conventional thermal decomposing blowing agents and are selected to be thermally and chemically compatible with the sealant composition and the desired processing temperature and use temperatures of the sealant. It should be clear that one would not select a blowing agent which has an activation temperature below that of the melt temperature of the magnetic sealant composition as this would mean that the blowing agent will start creating gas prematurely. This will result in the resin being too viscous and will reduce its ability to foam. On the other hand a blowing agent which requires too high an activation temperature, may not be activated by the sealing process and again no foaming will occur.

These blowing agents (which may be used alone or in combination with each other) are typically added in amounts ranging from about 2 percent to about 7 percent of the total composition weight with about 4 percent to about 5 percent being preferred. Naturally the amount added to the resin system will determine the amount of foaming during decomposition and therefore the dimension of the final product after blowing and in addition to some extent its cellular structure. The more common blowing agents which may be used for these systems are listed below with the preferred being Celogen OT.

Other conventional ingredients may be added to the resin composition such as fillers or oils to adjust the processability of the composition. These additives are conventional with conventional fillers being clay, calcium carbonate, barrites or silica and are normally present in amounts ranging from about 0 percent to about 25 percent by weight of the sealant prior to the addition of the magnetic particles. Some typical oils are naphthenic processing oils as well as phthalate and paraffinic oils, specifically diisodicyl phthalate, dioctyl phthalate and hydrocarbon resins, i.e. Escorez ® 2520 and are typically present in amounts of about 0 percent by weight to about 15 percent by weight of the sealant also before addition of the magnetic particles.

To this mixture is then added the magnetizable particles which are also conventional such as barium ferrite, strontium ferrite, iron oxides or powdered ALNICO alloys. The preferred material being strontium ferrite. These particles are present in the resin mixtures at concentrations of about 60 percent to about 80 percent by weight with about 65 to about 75 percent being preferred. Although many of these powders are available commercially, in limited particle size distributions, it has been found that by using smaller particle sizes (less than 150 microns) the resulting foam sealant has a very fine cell structure whereas if the particle sizes are generally limited to more than 150 microns, the cell structure is coarser. In addition, the actual cell structure may be made open cell with very large particles while the smaller particles usually result in close cell structure.

In certain instances it may be desirable to have a thermosetting foam magnetized sealant which, when foamed in place, will be harder and therefore give greater abrasion resistance. The present composition can easily be adapted to such a form by the simple addition of a small percentage of an epoxy resin. These will be the conventional epoxy resin such as EPON 828 which is a derivative of Bisphenol A. It is desirable to select the epoxy system (epoxy resin and curing agent) so that it will cure at or about the temperature at which the foam becomes activated and will create a cross-linked thermosetting component within the resulting seal thereby adding the hardness which is desired yet will not interfere with the expansion of the sealant. In other words, the epoxy resin should have a curing cycle which is compatible with the foaming cycle to result in the sealant foaming prior to the epoxy hardening. This is important because should the epoxy resin cure too early in the foaming cycle, the sealant will be too hard and will interfere with the ability of the foam to expand the sealant. The curing agents used in this application will be those conventional agent used to cure such epoxy resins, and will be present in conventional concentrations known to those skilled in the art. Typical curing agents are dicyanamide, boron trichloride amine complex and boron trifluoride amine complex. It has been found that such epoxy resins impart the same processing properties as the solubilizing agents and therefore, it can be used in place of such oils during preparation of the composition. Naturally, although many of the solubilizing agents may double as cross-linking agents and those compatible with this concept would be known to those skilled in the art. Or, in the alternative, an additional conventional amount of any compatible epoxy curing agent may be added to the composition to ensure adequate curing of the epoxy.

The preparation of these adhesive materials requires mixing the adhesive resin and other components into a homogenous mixture. It may be that to ensure ease of mixing, the adhesive should be heated or warmed to a temperature which will allow for ease of mixing but will not cause the blowing agent to react, or in the formulation having the epoxy resin below the cross-linking temperature of the epoxy. Typically, this temperature will be about 122° F. (50° C.) to about 158° F. (70° C.).

Once the adhesive has been mixed, the magnetizable particles are mixed in with the resin and typically are dispersed uniformly throughout the adhesive. All of this may be performed using conventional mixing or stirring devices.

The adhesive is then extruded (again below the activation temperature of the blowing agents or the cross-linking temperature of the epoxy if present) through conventional extrusion equipment into a tape or other desired form. It should be noted that since the particle sizes used in the sealant may be larger than normally used in extrusion processess, the extrusion head should be selected to have an opening to accommodate them. Should one be using a selectively small extruder head opening, the particle size range of the metallic particles may be limited accordingly. Typically, these extruded sealants range anywhere from about 60 mils to about 500 mils or one-half of an inch. However, larger or thicker size structures may be manufactured if so desired.

The extruded material is then passed through an electrical field which magnetizes the particles and aligns them in strips or lines along the tape. These electrical fields are conventional and may be generated by A.C. rectified current, direct current or capacitor discharge. The magnetized adhesives will typically have gauss readings of about 150 to 300. These gauss readings will be an average over a number of positions along the tape and it is desired and preferred that the gauss readings be in excess of 200.

Once the tape has been magnetized, it may be cut into the desired lengths or shapes and is ready to apply it to a substrate.

Once the magnetic tape has been extruded to the desired form, it may be applied to any magnetically attractive surface where the magnetic field of the sealant will maintain its position until and during the sealing process.

Sealants of the present composition are capable of expansion from about 10 percent to about 40 percent in thickness which is surprising due to the small amount of actual sealant present (about 20 percent to about 40 percent by weight).

Figure 2:
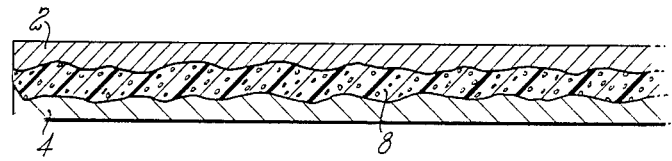
FIG. 2 is a cross-sectional view of FIG. 1 after sealant has been expanded.

The preferred embodiment is shown in FIG. 1 where two metal components 2 and 4 are overlaying one another creating a gap 6 between them. The sealant 8 may be positioned on the surface of one of the substrates 2 in the gap 6. The entire part is then exposed to sufficient heat which will raise the temperature of the sealant above its melt temperature and above the activation temperature of the blowing agent, causing the foam to melt, flow into or be magnetically drawn toward the metal substrates and additionally to foam thereby filling the gap 6. The resulting seal gap is shown in FIG. 2.

It should be understood that the invention is not limited to the particular embodiments shown and described herein, but that various changes and modifications may be made without departing from the spirit and scope of this novel concept as defined by the following claims.

I claim:

1. A magnetic sealant composition comprising:
   block copolymers of styrene and an elastomeric block,
   a solubilizing agent, magnetically charged particles and a blowing agent, wherein the sealant flows and foam upon heating to above the melt temperature of the sealant and the activation temperature of the blowing agent.

2. The composition of claim 1 wherein the solubilizing agent is present in concentrations from about 20 percent by weight to about 50 percent by weight of the styrene block copolymer.

3. The composition of claim 2 wherein the magnetic particles are present at concentrations of about 60 percent to about 80 percent by weight of the sealant.

4. A magnetic sealant composition comprising:
   block copolymers of styrene and an elastomeric block,
   a solubilizing agent, magnetically charged particles and a blowing agent, and an epoxy resin and an epoxy resin curing agent, wherein the resulting sealant flows and foams upon heating to a temperature above the melt temperature of the sealant and the activation temperature of the blowing agent and at the same temperature, will cure the epoxy resin subsequent to the sealant having expanded.

5. The composition of claim 1 wherein the copolymer has a tensile strength of about 2,000 psi at 75° F. (23.9° C.).

6. A method for sealing a gap between two or more meeting surfaces of which at least one of the surfaces is ferrometallic comprising placing a hot melt magnetic foamable sealant on at least one of the ferrometallic surfaces, heating the magnetic sealant to a sufficient temperature to cause the sealant to melt and activate the blowing agent thereby causing the sealant to flow and expand to seal the gap.

* * * * *